United States Patent
Hassanzadeh

(10) Patent No.: US 10,013,551 B2
(45) Date of Patent: Jul. 3, 2018

(54) ISOLATED MEMORY SPACE

(71) Applicant: Accenture Global Services Limited, Dublin (IE)

(72) Inventor: Amin Hassanzadeh, Arlington, VA (US)

(73) Assignee: Accenture Global Services Limited, Dublin (IE)

( * ) Notice: Subject to any disclaimer, the term of this patent is extended or adjusted under 35 U.S.C. 154(b) by 200 days.

(21) Appl. No.: 14/834,079

(22) Filed: Aug. 24, 2015

(65) Prior Publication Data

US 2017/0061122 A1    Mar. 2, 2017

(51) Int. Cl.
    *G06F 21/55* (2013.01)
    *G06F 21/53* (2013.01)
    *G06F 21/57* (2013.01)

(52) U.S. Cl.
    CPC ............ *G06F 21/53* (2013.01); *G06F 21/552* (2013.01); *G06F 21/57* (2013.01)

(58) Field of Classification Search
    None
    See application file for complete search history.

(56) References Cited

U.S. PATENT DOCUMENTS

| | | | |
|---|---|---|---|
| 5,918,229 A * | 6/1999 | Davis | G06F 9/5016 705/27.1 |
| 7,581,066 B2 | 8/2009 | Marwinski et al. | |
| 9,069,766 B2 | 6/2015 | Moshchuk et al. | |
| 2006/0248131 A1 * | 11/2006 | Marwinski | G06F 9/52 |
| 2009/0292931 A1 | 11/2009 | Henry et al. | |
| 2012/0017213 A1 * | 1/2012 | Hunt | G06F 21/53 718/100 |
| 2013/0013561 A1 * | 1/2013 | Chan | G06F 17/30132 707/636 |
| 2015/0278331 A1 * | 10/2015 | Blea | G06F 17/30575 707/610 |
| 2016/0179379 A1 * | 6/2016 | Hoffman | G06F 3/061 711/103 |

* cited by examiner

*Primary Examiner* — Tracy Chan

(74) *Attorney, Agent, or Firm* — Fish & Richardson P.C.

(57) ABSTRACT

Methods, systems, and apparatus, including computer programs encoded on a computer storage medium, for determining where to store a version of an object in an isolated environment. In one aspect, a method include actions of obtaining, from a process running in an isolated environment, a request to access an object and determining a frequency that changes to a version of the object stored in the isolated environment will be mapped back to a version of the object stored in the non-isolated environment. Additional actions include determining, based on the frequency that changes to a version of the object stored in the isolated environment are mapped back to a version of the object stored in the non-isolated environment, whether to store the version of the object in primary memory associated with the isolated environment or secondary memory associated with the isolated environment.

19 Claims, 3 Drawing Sheets

ISOLATED MEMORY SPACE

TECHNICAL FIELD

This document generally describes technology related to computer security.

BACKGROUND

Computer applications, e.g., web browser applications, browser-based applications, thin client applications, or standalone applications, that are run on computing devices, e.g., laptop computers, desktop computers, mobile computing devices, or computer systems, by one or more processors can include any number of computer processes that are executed by the one or more processors to provide the applications. For example, a web browser application may include separate processes that are executed and communicate with each other to retrieve, render, and output web pages, such as web pages that use one or more browser plugins.

Computer processes that are executed on a computer may pose security risks, such as the processes making unwanted changes on the computer, e.g., permission changes, data corruption, network settings modifications, and/or unauthorized accessing of sensitive information, e.g., private user information, financial information. A variety of security mechanisms have been used to minimize the potentially negative effects of such computer processes, such as sandboxing processes, e.g., running processes in an isolated environment, running processes on virtual machines, e.g., emulation of a computing environment, using antivirus software, implementing various network firewalls, using encryption for stored information, and using certificates to authenticate permission of various operations.

SUMMARY

In general, an aspect of the subject matter described in this specification may involve a process that uses information describing a frequency that changes to a version of an object stored in an isolated environment are mapped to a version of the object stored in the non-isolated environment to determine where to store the version of the object in the isolated environment. For example, a version of an object for which changes are frequently mapped back to a version of the object stored in a non-isolated environment may be stored in primary memory associated with the isolated environment, and a version of an object for which changes are infrequently mapped back to a version of the object stored in the non-isolated environment may be stored in secondary memory associated with the isolated environment.

Versions of objects stored in primary memory may be more quickly accessed than versions of objects stored in secondary memory. Accordingly, storing versions of objects for which changes will be more frequently mapped in primary memory may result in faster performance as access times may be reduced, and storing versions of objects for which changes will be less frequently mapped in secondary memory may ensure space in the primary memory is available for storing versions of objects for which changes will be more frequently mapped.

In some aspects, the subject matter described in this specification may be embodied in methods that may include the actions of obtaining, from a process running in an isolated environment, a request to access an object, determining a frequency that changes to a version of the object stored in the isolated environment will be mapped back to a version of the object stored in the non-isolated environment, and determining, based on the frequency that changes to a version of the object stored in the isolated environment are mapped back to a version of the object stored in the non-isolated environment, whether to store the version of the object in primary memory associated with the isolated environment or secondary memory associated with the isolated environment.

Other versions include corresponding systems, apparatus, and computer programs, configured to perform the actions of the methods, encoded on computer storage devices.

These and other versions may each optionally include one or more of the following features. For instance, in some implementations determining a frequency that changes to a version of the object stored in the isolated environment will be mapped back to a version of the object stored in the non-isolated environment includes determining a number of times that changes to the version of the object stored in the isolated environment will be mapped back to the version of the object in a length of time and determining the frequency based on the number of times that changes to the version of the object stored in the isolated environment will be mapped back to the version of the object in the length of time.

In certain aspects, determining a frequency that changes to a version of the object stored in the isolated environment will be mapped back to a version of the object stored in the non-isolated environment includes determining a frequency that changes to a version of another object stored in the isolated environment for the process were mapped back to a version of the other object stored in the non-isolated environment and determining the frequency that changes to the version of the object stored in the isolated environment will be mapped back to the version of the object stored in the non-isolated environment based on the frequency that changes to the version of the object stored in the isolated environment for the process were mapped back to the version of the other object stored in the non-isolated environment.

In some aspects, determining, based on the frequency that changes to a version of the object stored in the isolated environment are mapped back to a version of the object stored in the non-isolated environment, whether to store the version of the object in primary memory associated with the isolated environment or secondary memory associated with the isolated environment includes determining that the frequency that changes to the version of the object stored in the isolated environment will be mapped back to the version of the object stored in the non-isolated environment does not satisfy a threshold and in response to determining that the frequency that changes to the version of the object stored in the isolated environment will be mapped back to the version of the object stored in the non-isolated environment does not satisfy a threshold, storing the version of the object in secondary memory.

In some implementations, determining, based on the frequency that changes to a version of the object stored in the isolated environment are mapped back to a version of the object stored in the non-isolated environment, whether to store the version of the object in primary memory associated with the isolated environment or secondary memory associated with the isolated environment includes determining that the frequency that changes to the version of the object stored in the isolated environment will be mapped back to the version of the object stored in the non-isolated environment satisfies a threshold and in response to determining that the frequency that changes to the version of the object stored in the isolated environment will be mapped back to the version of the object stored in the non-isolated environment satisfies a threshold, storing the version of the object in primary memory.

In certain aspects, secondary memory includes a hard disk, primary memory includes a cache or main memory, and the object includes a computer file or a block of data.

In some aspects, actions include storing the object in the isolated environment based on the determination whether to store the version of the object in primary memory associated with the isolated environment or secondary memory associated with the isolated environment.

In some implementations, obtaining, from a process running in an isolated environment, a request to access an object includes obtaining a request to access an object stored in the non-isolated environment.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
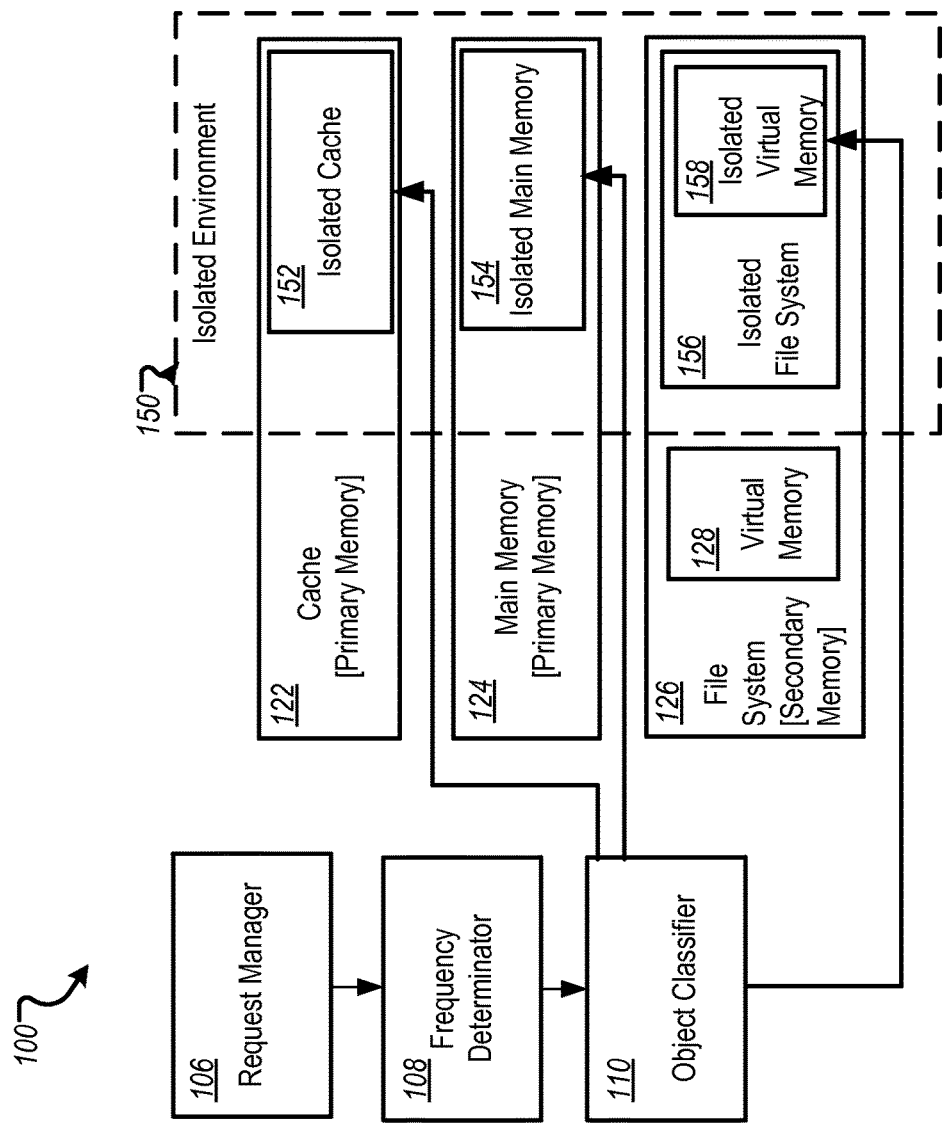
FIG. 1 is a block diagram of an example system that determines where to store a version of an object in an isolated environment based on a frequency that changes are mapped.

FIG. 1 depicts an example system 100 that determines where to store a version of an object in an isolated environment 150 based on a frequency that changes to a version of an object stored in an isolated environment are mapped to a non-isolated environment to determine where to store the version of the object in the isolated environment. The example system 100 may be implemented on a variety of appropriate computer systems, such as individual computing devices, e.g., laptops, desktop computers, mobile computing devices, computer server, and/or networked computing devices, e.g., server system, cloud-based computer system, client-server system.

The system 100 includes one or more processors and an operating system for the computer system that is run using the processors to provide a computing environment on the computer system. The system 100 can include a cache, e.g., a cache of a central processing unit (CPU), 122, a main memory 124, e.g., RAM, and a file system 126, on which virtual memory 128 is instantiated, that are in a native namespace and used by the processors and the operating system to execute processes that are not in isolation. The system 100 also includes an isolated environment 150 that includes an isolated cache 152, an isolated main memory 154, and an isolated file system 156, on which an isolated virtual memory 158 is instantiated, that can be restricted from the namespace (and other system resources/settings) of the non-isolated space.

The isolated environment 150 ensures that changes made by processes that may be potentially malicious and may cause unwanted changes to objects of the file system 126 may be isolated from the file system 126 until the isolated process is determined to be non-malicious, the changes are determined to be wanted, or some other criteria is satisfied. The act of applying changes made to a version of an object in the isolated environment 150 to the file system 126 may be referred to as "mapping." Applying changes to an object may include modifying the object based on the change. For example, a portion of an object may be set to a value indicated by a change to that portion of the object.

The system 100 further includes a request manager 106 that manages requests to access objects, a frequency determiner 108 that determines a frequency that changes to versions of objects stored in the isolated environment 150 will be mapped back to versions of the objects stored in the non-isolated environment, and an object classifier 110 that determines where to store versions of objects in the isolated environment 150.

The request manager 106 may manage requests to access objects. For example, the request manager 106 may obtain, from an isolated process running in the isolated environment 150, a request to access a file stored on the file system 126. In another example, the request manager 106 may obtain, from an isolated process running in the isolated environment, a request to access an object stored in the isolated virtual memory 158. In yet another example, the request manager 106 may obtain, from an isolated process running in the isolated environment, a request to access an object stored in the isolated memory 154. The request manager 106 may provide the requests from isolated processes to the frequency determinator 108.

The frequency determinator 108 may determine a frequency that changes to versions of objects stored in the isolated environment 150 will be mapped back to versions of the objects stored in the non-isolated environment. For example, the frequency determinator 108 may determine that changes to a version of a file stored in the isolated environment 150 will be mapped back to a version of the file stored on the file system 126 with a very high frequency. In another example, the frequency determinator 108 may determine a medium frequency that changes to a version of a file stored in the isolated environment 150 will be mapped back to a version of the file stored on the file system 126. In yet another example, the frequency determinator 108 may determine a very low frequency that changes to a version of a file stored in the isolated environment 150 will be mapped back to a version of the file stored on the file system 126.

The frequency may reflect a number of times changes will be mapped in a given time period, e.g., one minute, one hour, one day, lifetime of a process, or some other time period. For example, a very low frequency may be associated with one mapping in a lifetime of a process, a low frequency may be associated with between two to five mappings in the lifetime, a medium frequency may be associated with between six to twenty mappings in the lifetime, a high frequency may be associated with twenty one to fifty mappings in a lifetime, and very high may be associated with fifty mappings or more in a lifetime. The frequency categories of "very low," "low," "medium," "high," and "very high," may include additional or fewer categories. For example, categories may include only "low," "medium," and "high." The thresholds for each of the categories may be various predetermined ranges. For example, a medium frequency may be associated with six to twenty mappings in a lifetime, ten to thirty mappings in a lifetime, fifteen to thirty mappings in a lifetime, or some other thresholds.

Examples of how the frequency determinator 108 may determine the frequency that changes to versions of objects stored in the isolated environment 150 will be mapped back to versions of the objects stored in the non-isolated environment are described below.

The frequency determinator 108 may determine the frequency based on one or more of a history of mappings performed for a particular isolated process. For example, the frequency determinator 108 may determine that changes to a version of a file for a particular isolated process will be mapped back to a version of the object stored on the file system 126 with a medium frequency based on historical data indicating that changes for objects for the particular isolated process have been mapped back to the file system 126 with a medium frequency.

The frequency determinator 108 may determine the frequency based on a history of mappings performed for particular objects. For example, the frequency determinator 108 may determine that changes to a version of a file for an isolated process will be mapped back to a version of the object stored on the file system 126 with a medium frequency based on historical data indicating that changes for the version of the file in the isolated environment 150 have been mapped back to the file system 126 with a medium frequency.

The frequency determinator 108 may determine the frequency based on determining a number of times an isolated process will map changes to the object before terminating. For example, the frequency determinator 108 may determine a frequency of low frequency in response to determining that the isolated process will map changes to a version of the object ten times before terminating.

The frequency determinator 108 may determine the frequency based on limits set on the use of the isolated environment 150. These limits may force some changes to be mapped before, for example, process termination. Any of a variety of limits can be used, such as upper limits on the number of objects being stored in the isolated environment 150, number of isolated processes working on the same copy object, number of changes applied to an object while in the isolated environment 150 (before mapping), maximum times objects can be left unmapped inside the isolated environment 150, and/or any combination thereof.

For example, the frequency determinator may determine that a number of objects stored in the isolated environment 150 is forty eight, near an upper limit of fifty objects, and in response, determine that changes to a version of an object stored in the isolated environment 150 will be frequently mapped. In another example, the frequency determinator may determine that a number of objects stored in the isolated environment 150 is ten and not near an upper limit of fifty objects, and in response, determine that changes to a version of an object stored in the isolated environment 150 will be infrequently mapped. In yet another example, the frequency determinator may determine that a number of changes applied to a version of an object while in the isolated environment 150 before mapping is ten changes and that the version of the object has nine changes mapped, and in response, determine that changes to a version of an object stored in the isolated environment 150 will be frequently mapped. In still another example, the frequency determinator may determine that a number of changes applied to a version of an object while in the isolated environment 150 before mapping is ten changes and that the version of the object has two changes mapped, and in response, determine that changes to a version of an object stored in the isolated environment 150 will be infrequently mapped.

The frequency determinator 108 may determine the frequency based on consistency of the object. Postponing mappings until after isolated processes terminate may not always be possible. For example, if two processes (one isolated and the other not) are in the running state at the same time and need to make changes to the same object simultaneously (even though one of them is making changes to the copy version), it can be good practice to ensure consistency between the two processes and the objects they are working with. For instance, if consistency is not maintained for two different versions (actual and copy) as changes are made across the two versions, it may be impossible to merge such changes at a later time (e.g., some changes may be incompatible across the objects used by the isolated and not isolated processes).

Accordingly, changes to a version of an object of an isolated process may be mapped before the isolated process terminates. Therefore, the frequency determinator 108 may determine the frequency based on how frequently other processes will access the object. For example, the frequency determinator 108 may determine that other processes will access an object with a medium frequency and in response, determine the frequency that changes to a version of the object stored in the isolated environment 150 will be mapped back to a version of the object stored in the non-isolated environment is with the medium frequency. Further, the frequency determinator 108 may determine the frequency based on a number of processes that need access to a same object simultaneously. For example, the frequency determinator 108 may determine higher frequencies for objects to which more processes need simultaneous access.

The frequency determinator 108 may determine the frequency based on permissions settings for changes. For example, the frequency determinator 108 may determine frequency based on a permission setting for an object, a process, a group of processes, or an entire system. The frequency determinator 108 may determine a higher frequency for objects associated with a reactive permission setting and a lower frequency for objects associated with a proactive permission setting. The frequency determinator 108 may determine when a permission setting changes based on a security policy or another factor, and in response, re-determine a frequency of mappings associated with an object.

The frequency determinator 108 may determine the frequency based on other factors including type of the object, e.g., an object that is a file may be less frequently changed than an object that is a directory, or size of the object when requested by an isolated process, e.g., objects of larger sizes may take more space but may have more changes while in an isolated environment.

The object classifier 110 may determine where to store versions of objects in the isolated environment 150. For example, the object classifier 110 may determine to store a version of an object in primary memory or in secondary memory associated with the isolated environment 150. Primary memory may refer to volatile memory, e.g., main memory or a CPU cache. Secondary memory may refer to non-volatile memory, e.g., a hard drive or flash drive.

The object classifier 110 may determine where to store versions of the objects in the isolated environment 150 based on the frequency that changes to versions of objects stored in the isolated environment 150 will be mapped back to versions of the objects stored in the non-isolated environment. For example, the object classifier 110 may determine to store a version of an object that is associated with a frequency of high or very-high in the isolated cache 152, determine to store a version of an object that is associated with a frequency of medium in the isolated memory 14, and determine to store a version of an object that is associated with a frequency of low or very-low in the isolated virtual memory 158.

The object classifier 110 may determine where to store versions of the objects in the isolated environment 150 based predetermined thresholds. For example, predetermined threshold may be associated with very low, low, medium, high, and very high frequencies. The object classifier 110 may determine whether the frequency that changes to a version of an object stored in the isolated environment will be mapped back to a version of the object stored in the non-isolated environment satisfies a threshold. For example, the object classifier 110 may determine whether a frequency of changes to a version of a file stored in the isolated environment will be mapped back to a version of the file stored in the non-isolated environment satisfies a predetermined threshold for medium.

In response to determining that the frequency that changes to a version of an object stored in the isolated environment will be mapped back to a version of the object stored in the non-isolated environment satisfies a threshold, the object classifier 110 may determine to store the version of the object in primary memory. For example, in response to determining that a frequency of high for a mapping changes for a file satisfies a predetermined threshold of medium, the object classifier 110 may determine to store the file in the isolated memory 154.

In some implementations, the object classifier 110 may determine whether to store the version of the object in either the isolated cache 152 of the primary memory or the isolated main memory 154 of the primary memory. The object classifier 110 may determine to store versions of the objects in either the isolated cache 152 of the primary memory or the isolated main memory 154 of the primary memory based predetermined thresholds. For example, the object classifier 110 may determine whether a frequency of changes to a version of a file stored in the isolated environment will be mapped back to a version of the file stored in the non-isolated environment with a high frequency satisfies a predetermined threshold of high frequency and, in response, to determining the predetermined threshold of high frequency is satisfied, the object classifier 110 may determine to store the file in the isolated cache 152, and, in response, to determining the predetermined threshold of high frequency is not satisfied, the object classifier 110 may determine to store the file in the isolated main memory 154.

In response to determining that the frequency that changes to a version of an object stored in the isolated environment will be mapped back to a version of the object stored in the non-isolated environment does not satisfy a threshold, the object classifier 110 may determine to store the version of the object in secondary memory. For example, in response to determining that a frequency of low frequency for a mapping changes for a file is not more frequent than a predetermined threshold of medium frequency, the object classifier 110 may determine to store the file in the isolated virtual memory 158.

Figure 2:
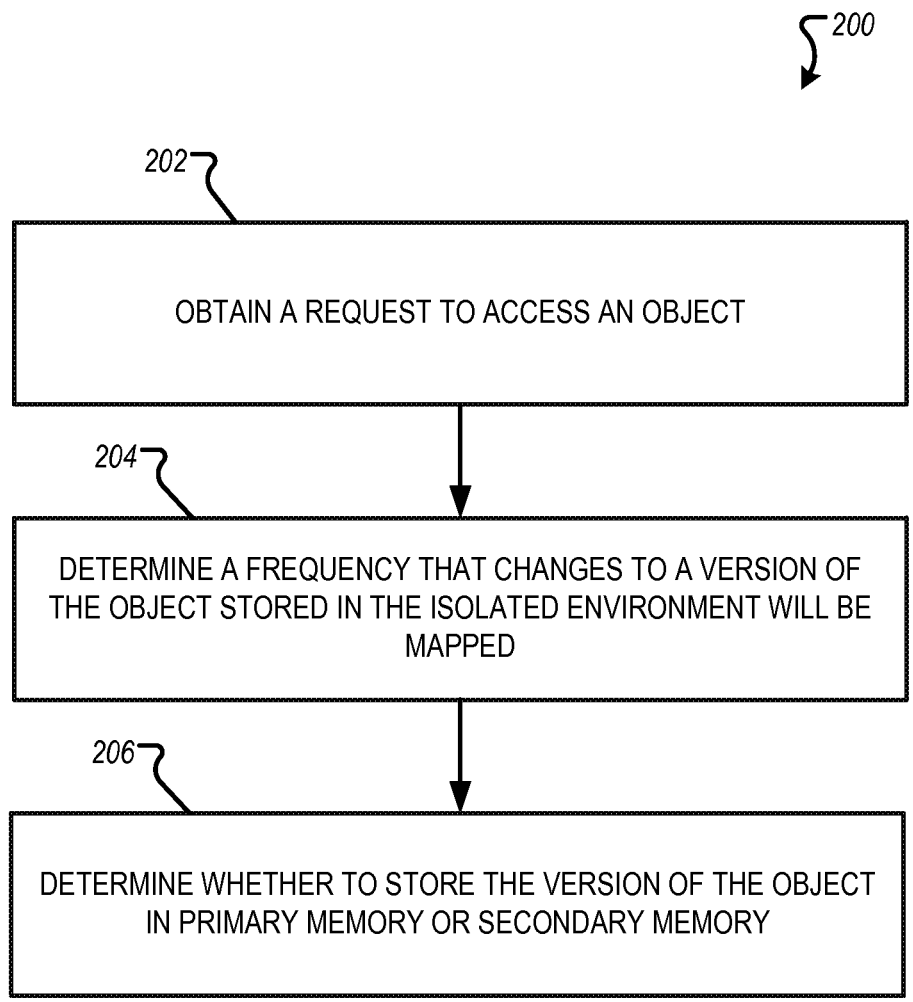
FIG. 2 is a flowchart of an example process for determining where to store a version of an object in an isolated environment based on a frequency that changes are mapped.

FIG. 2 is a flowchart of an example process 200 for determining where to store a version of an object in an isolated environment based on a frequency that changes are mapped. The following describes the process 200 as being performed by components of the system 100 that is described with reference to FIG. 1. However, the process 200 may be performed by other systems or system configurations.

The process 200 may include obtaining a request to access an object (202). For example, the request manager 106 may receive a request from an isolated process to access a version of an object stored in the file system 126. In another example, the request manager 106 may receive a request from an isolated process to access a version of an object stored in the isolated virtual memory 158.

The process 200 may include determining a frequency that changes to a version of the object stored in the isolated environment will be mapped (204). For example, the frequency determinator 108 may determine that changes to the version of the object stored in the isolated environment will be mapped back to the version of the object stored in the non-isolated environment a total of ten more times during a lifetime of an isolated process, and in response, determine a frequency of middle. In another example, the frequency determinator 108 may determine that for a version of the object stored in the isolated environment, a time period between changes were last mapped and when changes are currently being mapped, and in response, determine a frequency of middle.

The process 200 may include determining whether to store the version of the object in primary memory or secondary memory (206). For example, the object classifier 110 may determine to store a version of the object in the isolated cache 152 in response to determining that a determined frequency of mapping changes to a version of the object stored in the isolated environment with a high frequency satisfies a predetermined threshold of high frequency. In another example, the object classifier 110 may determine to store a version of the object in the isolated memory 154 in response to determining that a determined frequency of mapping changes to a version of the object stored in the isolated environment with a medium frequency does not satisfy a predetermined threshold of high frequency but does satisfy a predetermined threshold of medium frequency. In yet another example, the object classifier 110 may determine to store a version of the object in the isolated virtual memory 158 in response to determining that a determined frequency of mapping changes to a version of the object stored in the isolated environment with a low frequency does not satisfy a predetermined threshold of high frequency or a predetermined threshold of medium frequency.

Figure 3:
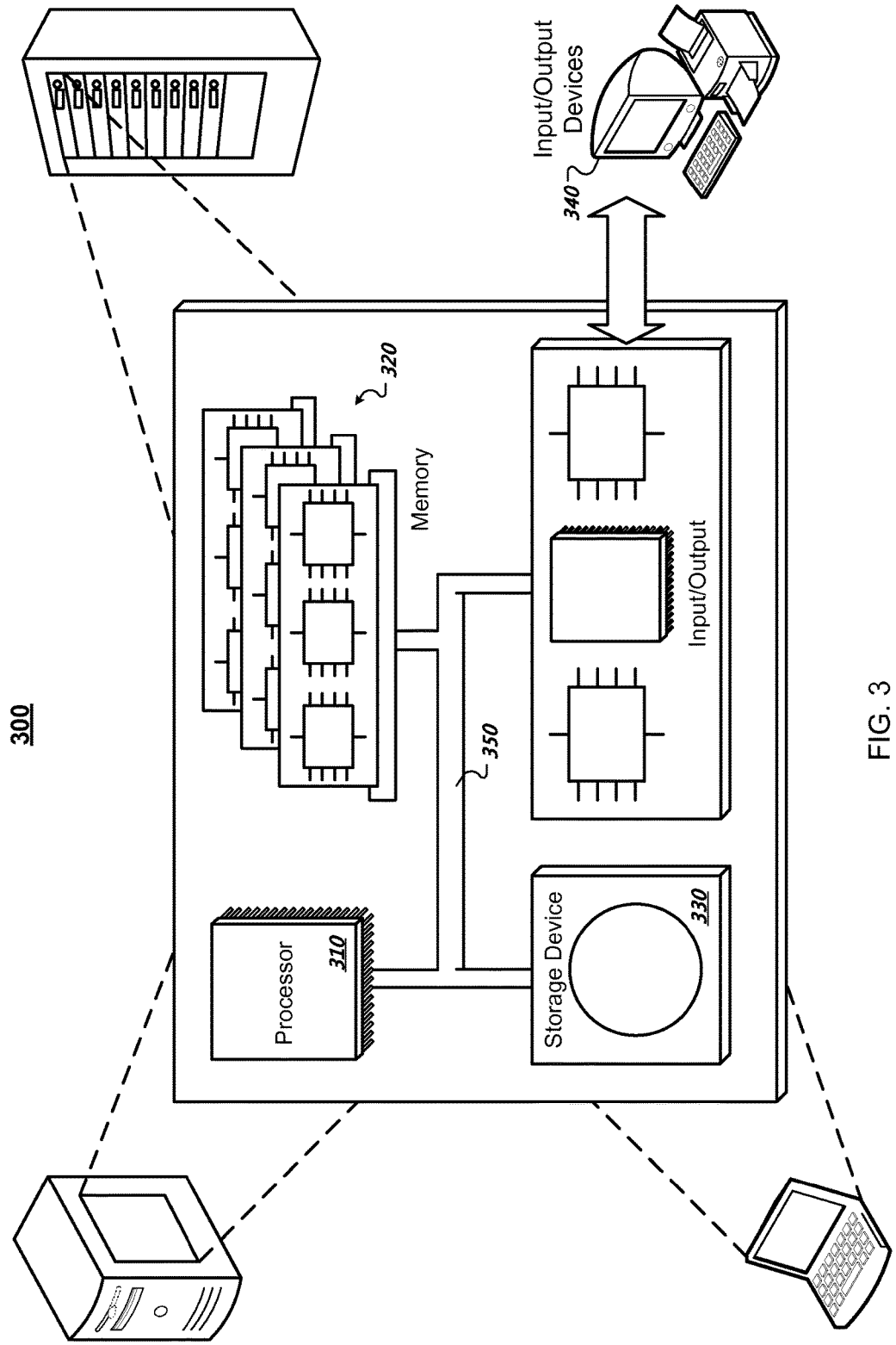
FIG. 3 illustrates a schematic diagram of an exemplary generic computer system.

FIG. 3 illustrates a schematic diagram of an exemplary generic computer system. The system 300 can be used for the operations described in association with the process 200 according to some implementations. The system 300 may be included in the system 100.

The system 300 includes a processor 310, a memory 320, a storage device 330, and an input/output device 340. Each of the components 310, 320, 330, and 320 are interconnected using a system bus 350. The processor 410 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 400. In one implementation, the input/output device 340 includes a keyboard and/or pointing device. In another implementation, the input/output device 340 includes a display unit for displaying graphical user interfaces.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer-implemented method comprising:
    obtaining, from a process running in an isolated environment of a computing device that executes the process in isolation from processes running in a non-isolated environment of the computing device, a request to access an object stored in the non-isolated environment, wherein the isolated environment includes an isolated primary memory instantiated from a primary memory of the computing device and restricted from portions of the primary memory of the computing device corresponding to the non-isolated environment and an isolated secondary memory instantiated from a secondary memory of the computing device and restricted from portions of the secondary memory of the computing device corresponding to the non-isolated environment;
    determining a map back frequency that reflects a frequency that future changes to a first version of the object that will be stored in the isolated environment of the computing device in response to the request will be mapped back to a second version of the object stored in the non-isolated environment of the computing device, wherein determining the map back frequency that reflects the frequency that future changes to the first version of the object that will be stored in the isolated environment of the computing device in response to the request will be mapped back to the second version of the object stored in the non-isolated environment of the computing device is based on at least one or more of:
        an upper limit on a number of objects stored in the isolated environment;
        a number of isolated processes using the object;
        an upper limit on a number of times the object in the isolated environment can be changed before being mapped back to the non-isolated environment;
        a maximum of times objects can be left unmapped inside the isolated environment; or
        a size of the object; and
    determining, based on the map back frequency that reflects the frequency that future changes to the first version of the object that will be stored in the isolated environment of the computing device in response to the request will be mapped back to the second version of the object stored in the non-isolated environment of the computing device, whether to store the second version of the object in the primary memory associated with the isolated environment of the computing device or the secondary memory associated with the isolated environment of the computing device.

2. The method of claim 1, wherein determining a map back frequency that reflects a frequency that future changes to a first version of the object that will be stored in the isolated environment of the computing device in response to the request will be mapped back to a second version of the object stored in the non-isolated environment of the computing device:
    determining a number of times that changes to the first version of the object stored in the isolated environment will be mapped back to the second version of the object in a length of time; and
    determining the map back frequency based on the number of times that changes to the first version of the object stored in the isolated environment will be mapped back to the second version of the object in the length of time.

3. The method of claim 1, wherein determining a map back frequency that reflects a frequency that future changes to a first version of the object that will be stored in the isolated environment of the computing device in response to the request will be mapped back to a second version of the object stored in the non-isolated environment of the computing device comprises:
    determining a frequency that changes to a first version of another object stored in the isolated environment for the process were mapped back to a second version of the another object stored in the non-isolated environment; and
    determining the map back frequency that reflects the frequency changes to the first version of the object stored in the isolated environment will be mapped back to the second version of the object stored in the non-isolated environment based on the frequency that changes to the first version of the another object stored in the isolated environment for the process were mapped back to the second version of the another object stored in the non-isolated environment.

4. The method of claim 1, wherein determining, based on the map back frequency that reflects the frequency that future changes to the first version of the object that will be stored in the isolated environment of the computing device in response to the request will be mapped back to the second version of the object stored in the non-isolated environment of the computing device, whether to store the second version of the object in the primary memory associated with the isolated environment of the computing device or the secondary memory associated with the isolated environment of the computing device comprises:
    determining that the map back frequency that reflects the frequency that future changes to the first version of the object that will be stored in the isolated environment will be mapped back to the second version of the object stored in the non-isolated environment does not satisfy a threshold; and
    in response to determining that the map back frequency that reflects the frequency that future changes to the first version of the object that will be stored in the isolated environment will be mapped back to the second version of the object stored in the non-isolated environment does not satisfy the threshold, storing the first version of the object in secondary memory.

5. The method of claim 1, wherein determining, based on the map back frequency that reflects the frequency that future changes to the first version of the object that will be stored in the isolated environment of the computing device in response to the request will be mapped back to the second version of the object stored in the non-isolated environment of the computing device, whether to store the second version of the object in the primary memory associated with the isolated environment of the computing device or the secondary memory associated with the isolated environment of the computing device comprises:
   determining that the map back frequency that reflects the frequency that future changes to the first version of the object that will be stored in the isolated environment will be mapped back to the second version of the object stored in the non-isolated environment satisfies a threshold; and
   in response to determining that the map back frequency that reflects the frequency that future changes to the first version of the object that will be stored in the isolated environment will be mapped back to the second version of the object stored in the non-isolated environment satisfies the threshold, storing the first version of the object in primary memory.

6. The method of claim 1, wherein secondary memory comprises a hard disk.

7. The method of claim 1, wherein primary memory comprises a cache or main memory.

8. The method of claim 1, wherein the object comprises a computer file or a block of data.

9. The method of claim 1, comprising:
   storing the object in the isolated environment based on the determination whether to store the first version of the object in primary memory associated with the isolated environment or secondary memory associated with the isolated environment.

10. The method of claim 1, wherein obtaining, from a process running in an isolated environment, a request to access an object comprises:
   obtaining a request to access the version of the object stored in the non-isolated environment.

11. The method of claim 1, wherein determining a map back frequency that reflects a frequency that future changes to a first version of the object that will be stored in the isolated environment of the computing device in response to the request will be mapped back to a second version of the object stored in the non-isolated environment of the computing device comprises:
   determining the map back frequency that reflects a frequency that the second version of the object stored in the non-isolated environment will be modified in the future based on changes made in the future to the first version of the object stored in the isolated environment.

12. A system comprising:
   one or more computers and one or more storage devices storing instructions that are operable, when executed by the one or more computers, to cause the one or more computers to perform operations comprising:
   obtaining, from a process running in an isolated environment of a computing device that executes the process in isolation from processes running in a non-isolated environment of the computing device, a request to access an object stored in the non-isolated environment, wherein the isolated environment includes an isolated primary memory instantiated from a primary memory of the computing device and restricted from portions of the primary memory of the computing device corresponding to the non-isolated environment and an isolated secondary memory instantiated from a secondary memory of the computing device and restricted from portions of the secondary memory of the computing device corresponding to the non-isolated environment;
   determining a map back frequency that reflects a frequency that future changes to a first version of the object that will be stored in the isolated environment of the computing device in response to the request will be mapped back to a second version of the object stored in the non-isolated environment of the computing device, wherein determining the map back frequency that reflects the frequency that future changes to the first version of the object that will be stored in the isolated environment of the computing device in response to the request will be mapped back to the second version of the object stored in the non-isolated environment of the computing device is based on at least one or more of:
      an upper limit on a number of objects stored in the isolated environment;
      a number of isolated processes using the object;
      an upper limit on a number of times the object in the isolated environment can be changed before being mapped back to the non-isolated environment;
      a maximum of times objects can be left unmapped inside the isolated environment; or
      a size of the object; and
   determining, based on the map back frequency that reflects the frequency that future changes to the first version of the object that will be stored in the isolated environment of the computing device in response to the request will be mapped back to the second version of the object stored in the non-isolated environment of the computing device, whether to store the second version of the object in the primary memory associated with the isolated environment of the computing device or the secondary memory associated with the isolated environment of the computing device.

13. The system of claim 12, wherein determining a map back frequency that reflects a frequency that future changes to a first version of the object that will be stored in the isolated environment of the computing device in response to the request will be mapped back to a second version of the object stored in the non-isolated environment of the computing device:
   determining a number of times that changes to the first version of the object stored in the isolated environment will be mapped back to the second version of the object in a length of time; and
   determining the map back frequency based on the number of times that changes to the first version of the object stored in the isolated environment will be mapped back to the second version of the object in the length of time.

14. The system of claim 12, wherein determining a map back frequency that reflects a frequency that future changes to a first version of the object that will be stored in the isolated environment of the computing device in response to the request will be mapped back to a second version of the object stored in the non-isolated environment of the computing device comprises:
   determining a frequency that changes to a first version of another object stored in the isolated environment for the process were mapped back to a second version of the another object stored in the non-isolated environment; and
   determining the map back frequency that reflects the frequency changes to the first version of the object stored in the isolated environment will be mapped back to the second version of the object stored in the non-isolated environment based on the frequency that changes to the first version of the another object stored in the isolated environment for the process were mapped back to the second version of the another object stored in the non-isolated environment.

15. The system of claim 12, wherein determining, based on the map back frequency that reflects the frequency that future changes to the first version of the object that will be stored in the isolated environment of the computing device in response to the request will be mapped back to the second version of the object stored in the non-isolated environment of the computing device, whether to store the second version of the object in the primary memory associated with the isolated environment of the computing device or the secondary memory associated with the isolated environment of the computing device comprises:
  determining that the map back frequency that reflects the frequency that future changes to the first version of the object that will be stored in the isolated environment will be mapped back to the second version of the object stored in the non-isolated environment does not satisfy a threshold; and
  in response to determining that the map back frequency that reflects the frequency that future changes to the first version of the object that will be stored in the isolated environment will be mapped back to the second version of the object stored in the non-isolated environment does not satisfy the threshold, storing the first version of the object in secondary memory.

16. The system of claim 12, wherein determining, based on the map back frequency that reflects the frequency that future changes to the first version of the object stored in the isolated environment of the computing device the request will be mapped back to the second version of the object stored in the non-isolated environment of the computing device, whether to store the second version of the object in the primary memory associated with the isolated environment of the computing device or the secondary memory associated with the isolated environment of the computing device comprises:
  determining that the map back frequency that reflects the frequency that future changes to the first version of the object that will be stored in the isolated environment will be mapped back to the second version of the object stored in the non-isolated environment satisfies a threshold; and
  in response to determining that the map back frequency that reflects the frequency that future changes to the first version of the object that will be stored in the isolated environment will be mapped back to the second version of the object stored in the non-isolated environment satisfies the threshold, storing the first version of the object in primary memory.

17. The system of claim 12, wherein secondary memory comprises a hard disk.

18. The system of claim 12, wherein primary memory comprises a cache or main memory.

19. A non-transitory computer-readable medium storing software comprising instructions executable by one or more computers which, upon such execution, cause the one or more computers to perform operations comprising:
  obtaining, from a process running in an isolated environment of a computing device that executes the process in isolation from processes running in a non-isolated environment of the computing device, a request to access an object stored in the non-isolated environment, wherein the isolated environment includes an isolated primary memory instantiated from a primary memory of the computing device and restricted from portions of the primary memory of the computing device corresponding to the non-isolated environment and an isolated secondary memory instantiated from a secondary memory of the computing device and restricted from portions of the secondary memory of the computing device corresponding to the non-isolated environment;
  determining a map back frequency that reflects a frequency that future changes to a first version of the object that will be stored in the isolated environment of the computing device in response to the request will be mapped back to a second version of the object stored in the non-isolated environment of the computing device, wherein determining the map back frequency that reflects the frequency that future changes to the first version of the object that will be stored in the isolated environment of the computing device in response to the request will be mapped back to the second version of the object stored in the non-isolated environment of the computing device is based on at least one or more of:
    an upper limit on a number of objects stored in the isolated environment;
    a number of isolated processes using the object;
    an upper limit on a number of times the object in the isolated environment can be changed before being mapped back to the non-isolated environment;
    a maximum of times objects can be left unmapped inside the isolated environment; or
  a size of the object; and
  determining, based on the map back frequency that reflects the frequency that future changes to the first version of the object stored in the isolated environment of the computing device the request will be mapped back to the second version of the object stored in the non-isolated environment of the computing device, whether to store the second version of the object in the primary memory associated with the isolated environment of the computing device or the secondary memory associated with the isolated environment of the computing device.

* * * * *